US012798423B2

(12) United States Patent
Shum et al.

(10) Patent No.: US 12,798,423 B2
(45) Date of Patent: Nov. 17, 2026

(54) ELECTRIC VEHICLE TO ELECTRIC VEHICLE CHARGER

(71) Applicant: Vector Products, Inc., Boca Raton, FL (US)

(72) Inventors: Ling To Shum, Boca Raton, FL (US); Salvador Herrera, Tamarac, FL (US)

(73) Assignee: Vector Products, Inc., Boca Raton, FL (US)

( * ) Notice: Subject to any disclaimer, the term of this patent is extended or adjusted under 35 U.S.C. 154(b) by 675 days.

(21) Appl. No.: 18/353,140

(22) Filed: Jul. 17, 2023

(65) Prior Publication Data

US 2024/0067024 A1 Feb. 29, 2024

Related U.S. Application Data

(60) Provisional application No. 63/373,639, filed on Aug. 26, 2022.

(51) Int. Cl.
*B60L 53/62* (2019.01)
*B60L 53/16* (2019.01)
*B60L 58/12* (2019.01)

(52) U.S. Cl.
CPC ............... *B60L 53/62* (2019.02); *B60L 53/16* (2019.02); *B60L 58/12* (2019.02); *B60L 2210/40* (2013.01)

(58) Field of Classification Search
CPC .......... B60L 53/62; B60L 53/16; B60L 58/12; B60L 2210/40; B60L 53/30; B60L 53/14; B60L 53/305; B60L 55/00; B60L 53/18
See application file for complete search history.

(56) References Cited

U.S. PATENT DOCUMENTS 8,737,026 B2 * 5/2014 Ueno ...................... B60L 53/67 361/42
9,209,638 B2 * 12/2015 Bouman ................ B60L 53/20
(Continued)

FOREIGN PATENT DOCUMENTS

CN 104253464 B 12/2014
CN 207559623 U * 6/2018
(Continued)

OTHER PUBLICATIONS

Green Magazine, "New Nissan LEAF e+ with bidirectional charging", URL: https://greenmagazine.com.au/new-nissan-leaf-e-with-bi-directional-charging, Accessed Jul. 20, 2022, 3 pages.
(Continued)

*Primary Examiner* — Jared Fureman
(74) *Attorney, Agent, or Firm* — Cesari and McKenna, LLP

(57) ABSTRACT

An electric vehicle (EV) to EV battery charger is provided, where a source EV provides electrical charge to a recipient EV to recharge the recipient EV's battery, without requiring a connection to a grid line. The battery charger includes an input port configured to couple to an electrical port of a source electric vehicle. A power control circuit of the battery charger receives a source power signal from the source electric vehicle through the input port. A converter circuit of the battery charger converts the source power signal to an output power signal according to power requirements of a recipient electric vehicle. The battery charger further includes an output port configured to couple to a charging port of a recipient electric vehicle. A microcontroller of the battery charger is configured to manage a transfer of the output power signal to the recipient electric vehicle through the output port.

7 Claims, 10 Drawing Sheets

(56) References Cited

U.S. PATENT DOCUMENTS

| | | | | |
|---|---|---|---|---|
| 10,059,210 | B2 * | 8/2018 | Yang | B60L 53/24 |
| 10,322,636 | B2 * | 6/2019 | Lee | B60L 53/11 |
| 10,427,530 | B2 * | 10/2019 | Ricci | B60L 53/65 |
| 11,264,825 | B1 * | 3/2022 | Harris | H02J 7/342 |
| 11,603,005 | B2 * | 3/2023 | Atluri | B60L 53/16 |
| 12,145,459 | B1 * | 11/2024 | Subbulakshmi | B60L 53/16 |
| 2011/0149455 | A1 * | 6/2011 | Ueno | B60L 53/31 361/87 |
| 2013/0049677 | A1 * | 2/2013 | Bouman | B60L 1/02 320/106 |
| 2014/0184141 | A1 * | 7/2014 | Loftus | B60L 3/00 320/104 |
| 2018/0178661 | A1 | 6/2018 | Manotas, Jr. | |
| 2019/0165591 | A1 * | 5/2019 | Kisacikoglu | B60L 53/20 |
| 2020/0324665 | A1 * | 10/2020 | Mackenzie | H02M 7/797 |
| 2025/0026208 | A1 * | 1/2025 | Prasad | B60L 53/11 |
| 2025/0178461 | A1 * | 6/2025 | Prasad | B60L 53/14 |
| 2026/0021734 | A1 * | 1/2026 | Prasad | B60L 53/11 |
| 2026/0025010 | A1 * | 1/2026 | Prasad | H02J 7/56 |
| 2026/0077668 | A1 * | 3/2026 | Gustafson | B60L 53/57 |

FOREIGN PATENT DOCUMENTS

| | | | | | |
|---|---|---|---|---|---|
| CN | 110416781 | A | * | 11/2019 | H01R 13/648 |
| CN | 216121846 | U | * | 3/2022 | |
| CN | 114825314 | A | * | 7/2022 | H02J 7/70 |
| KR | 20150066961 | A | * | 6/2015 | H02J 7/82 |
| KR | 20210005396 | A | * | 1/2021 | H02J 7/855 |
| WO | 2014206373 | A1 | | 12/2014 | |
| WO | WO-2021069110 | A1 | * | 4/2021 | B60L 1/00 |

OTHER PUBLICATIONS

Lozanova, Sarah, “Bidirectional Charging: What It Is And How Electric Vehicle Drivers Can Benefit”, URL: https://www.greenlancer.com/post/bidirectional-charging, Accessed Jul. 20, 2022, dated Jan. 3, 2022, 3 pages.

* cited by examiner

IEC DC Charging Systems

| | System A | System B | System C | |
|---|---|---|---|---|
| | CHAdeMO (Japan) | GB/T (PRC) | COMBO1 (US) | COMBO2 (DE) |
| Connector |  |  |  |  |
| Vehicle Inlet |  |  |  |  |
| Communication Protocol | CAN | | PLC | |

ELECTRIC VEHICLE TO ELECTRIC VEHICLE CHARGER

CROSS REFERENCE TO RELATED APPLICATIONS

This patent application claims the benefit of U.S. Provisional Patent Application No. 63/373,639 filed Aug. 26, 2022, the disclosure of which is incorporated by reference herein in its entirety.

BACKGROUND OF THE INVENTION

Passenger electric vehicles are powered on electricity from an on-board battery, which requires regular charging. The charging is accomplished through the charging port located on the electric vehicle. In order to charge the battery, an electrical source is required, typically from a charging station. The electric vehicle (EV) comes equipped with an external charger interface to connect the EV's charging port to the charging station. As illustrated in FIG. 1, the charging station 102 is coupled to a grid or utility line 106. The charging station 102 can be a portable or a standalone unit and is required to be wired directly to the grid line 106. The charging station 102 comes equipped with a conductor 105 and a connector 104. When charging, the connector 104 is attached to the EV charging port 103. Once all of the connections and safety checks are satisfactorily completed, the charging station 102 communicates with the EV's on-board computer through the connector 104, indicating that the charging process can start. The EV 101 can be recharged with alternating current (AC) up to 40-50 kW or with direct current (DC) up to or greater than 150 kW.

When charging with AC, an industry standard connector is used, e.g., a J-Connector, depending on the manufacturer and the geographical region. The connector 104 is inserted into the EV charging port 103 for the purpose of recharging the battery. Similarly, when charging with DC, a connector 104 is inserted into the EV charging port 103.

However, when the EV's battery requires recharging, a charging station 102 may not be available or may not be reachable before the EV's battery is too depleted to operate the EV battery. Even when the charging station 102 is portable, the charging station 102 must be connected to a grid line 106 in order to charge the EV. If the EV battery becomes too depleted to operate the EV 101, then the EV 101 will need to be towed to a charging station 102 that is already connected to a grid line 106 or to a location where the charging station 102 can connect to a grid line 106. This may be problematic when the EV 101 or its operator is involved in an emergency situation. Therefore, there is a need for an alternative to recharging an EV battery using a charging station that requires a connection to a grid line.

BRIEF SUMMARY OF THE INVENTION

Disclosed herein is an electric vehicle to electric vehicle charger as specified in the independent claims. Embodiments of the present invention are given in the dependent claims. Embodiments of the present invention can be freely combined with each other if they are not mutually exclusive.

According to one embodiment of the present invention, a battery charger includes an input port configured to physically and electrically couple to an electrical port of a source electric vehicle. A power control circuit of the battery charger receives a source power signal from the source electric vehicle through the input port. A converter circuit of the battery charger converts the source power signal to an output power signal according to power requirements of a recipient electric vehicle. The battery charger further includes an output port configured to physically and electrically couple to a charging port of a recipient electric vehicle. A microcontroller of the battery charger is configured to manage a transfer of the output power signal to the recipient electric vehicle through the output port.

In one aspect, the output port of the battery charger includes a direct current (DC) connection and an alternating current (AC) connection. The battery charger includes a split circuit configured to route the source power signal to the DC connection or the AC connection according to the power requirements of the recipient electric vehicle.

In another aspect, the battery charger includes a dedicated DC output port or a dedicated AC output port.

According to another embodiment of the present invention, a method for charging a battery includes: detecting physical and electrical connections to a source electric vehicle and a recipient electric vehicle; receiving a direct current (DC) power signal directly from a battery of the source electric vehicle; converting the DC power signal from the battery of the source electric vehicle to an output power signal according to power requirements of the recipient electric vehicle; and outputting the output power signal to a charging port of the recipient electric vehicle, the charging port electrically coupled to a battery of the recipient electric vehicle.

DETAILED DESCRIPTION OF THE INVENTION

The present invention provides an electric vehicle to electric vehicle charger. The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment," "an embodiment," "an exemplary embodiment," "some embodiments," or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In general, features described in one embodiment might be suitable for use in other embodiments as would be apparent to those skilled in the art.

Embodiments of the present invention provide an electric vehicle to electric vehicle charger (EV to EV charger), where a source EV can provide electrical charge to a recipient EV to recharge the recipient EV's battery, without requiring a connection to a grid line. The EV to EV charger provides a smart link between the two EVs. The EV to EV charger monitors the flow rate of the electricity from the source EV to the recipient EV and manages the charging process to prevent depletion of the source EVs onboard battery.

Figure 1:
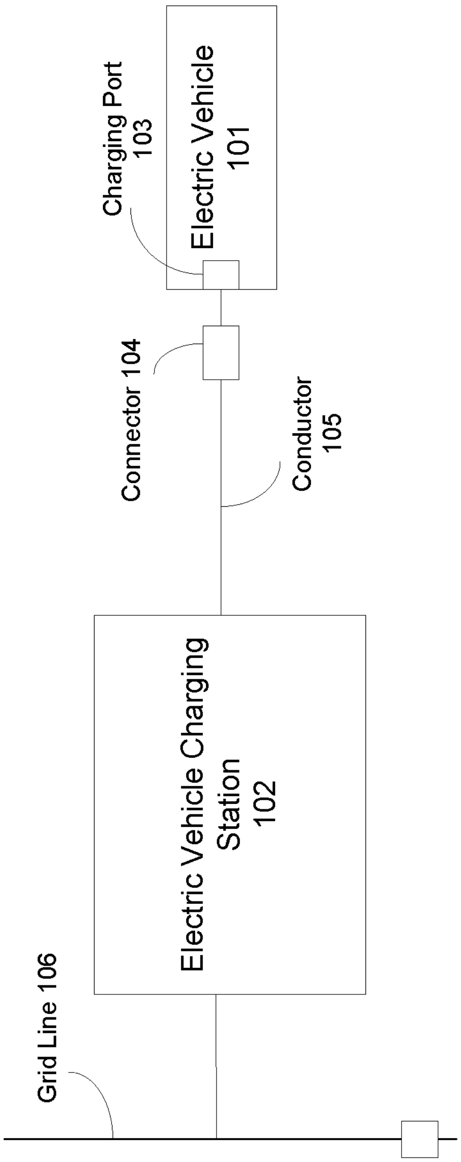
FIG. 1 (Prior Art)
FIG. 1 illustrates a conventional system for charging an electric vehicle.
Figure 2:
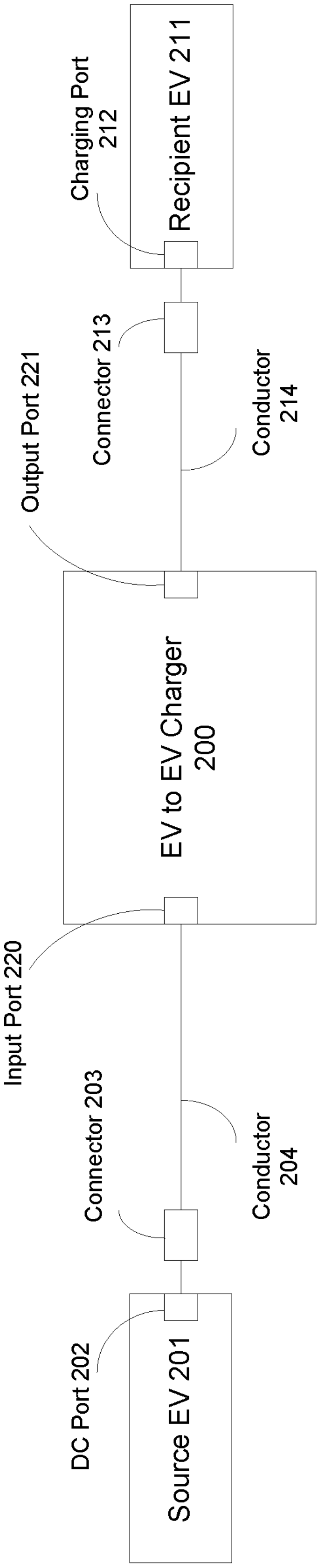
FIG. 2 illustrates a system for charging an EV using an EV to EV charger according to some embodiments.

FIG. 2 illustrates a system for charging an EV using an EV to EV charger 200 according to some embodiments. The EV to EV charger 200 includes conductors 204, 214 and connectors 203, 213. An input port 220 of the charger 200 is configured to physically and electrically couple to the DC port 202 of a source EV 201 via the connector 203 and conductor 204. An output port 221 of the charger 200 is also configured to physically and electrically couple to the charging port 212 of a recipient EV 211 via connector 213 and conductor 214. Each conductor 204, 214 is composed of multiple independent wire conductors, along which signals travel, in a single outer wires protection jacket. Energy from the onboard battery of the source EV 201 is used to charge the onboard battery of the recipient EV 211 via the charger 200, without requiring the charger 200 to be connected to a grid line.

Figure 3:
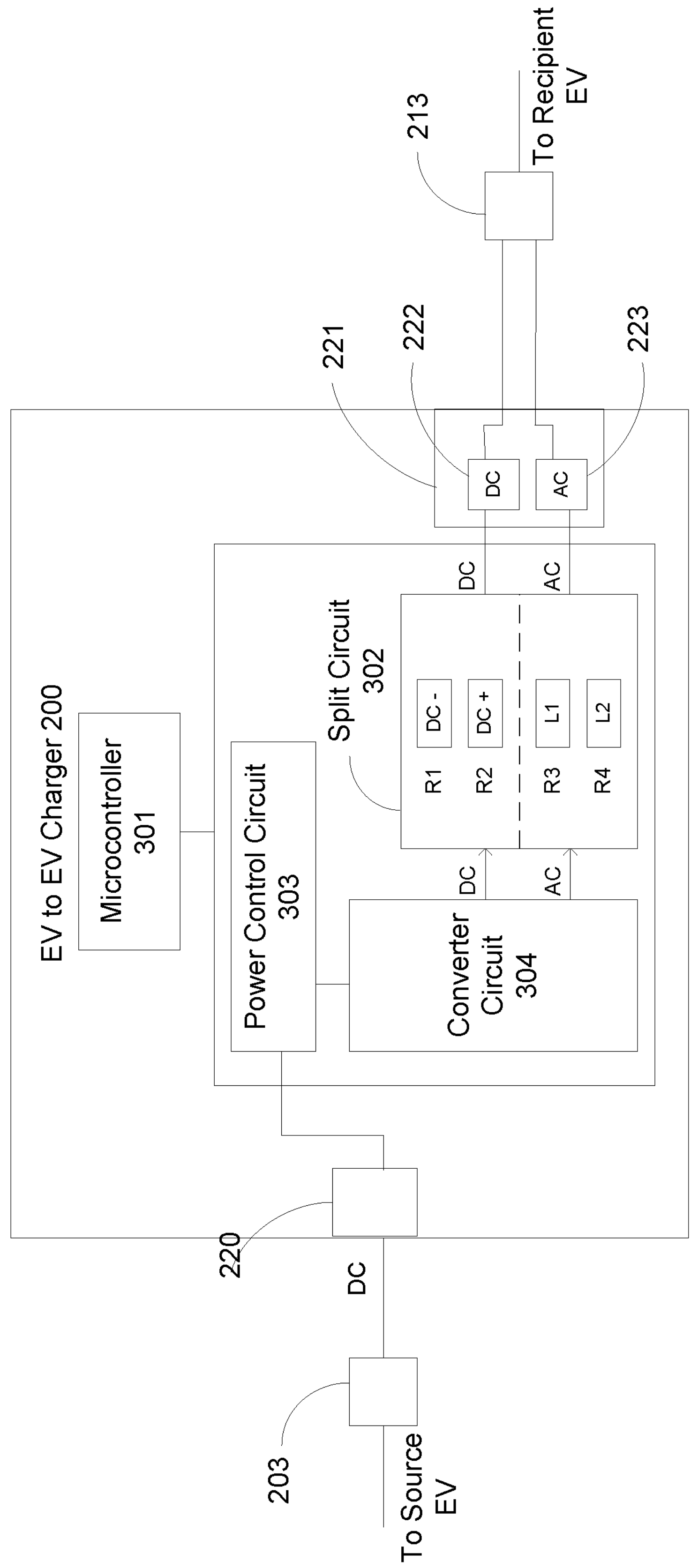
FIG. 3 illustrates the EV to EV charger according to some embodiments.

FIG. 3 illustrates the EV to EV charger 200 according to some embodiments. The charger 200 includes an input port 220 for physically and electrically coupling to the source EV 201 and an output port 221 for physically and electrically coupling to the recipient EV 211. The charger 200 includes a microcontroller 301, a split circuit 302, a power control circuit 303, and a converter circuit 304, as described further below. The output port 221 includes a DC connection 222 and an AC connection 223.

Figure 4:
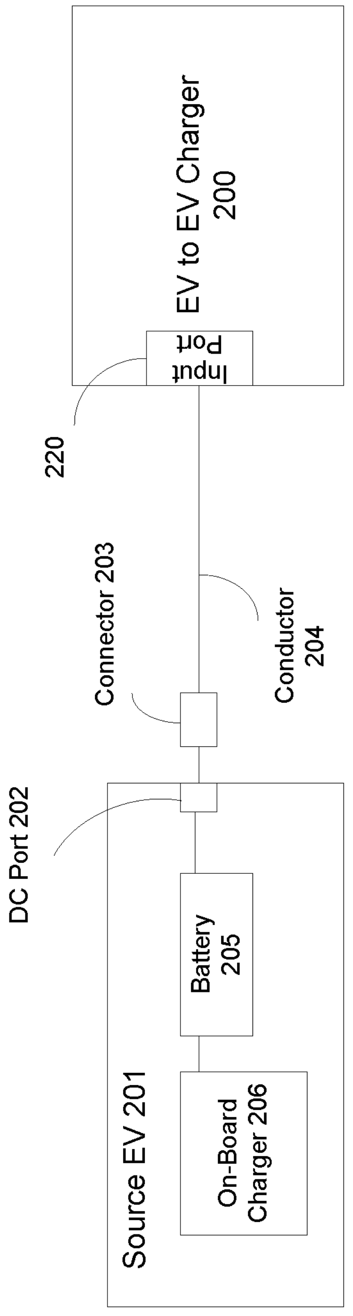
FIG. 4 illustrates the source EV connections to the charger.

FIG. 4 illustrates the source EV connections to the charger 200. Referring to both FIGS. 3 and 4, the input port 220 of the charger 200 is connected to the DC port 202 of the source EV 201 via the connector 203 and conductor 204. The power control unit 303 of the charger 200 includes circuitry configured to receives a high voltage DC signal directly from the source EV's battery 205 through the charger 200's input port 220. The DC port 202 of the source EV 201 is connected directly to the internal battery 205 of the source EV 201, bypassing its on-board charger 206.

Figure 5A:
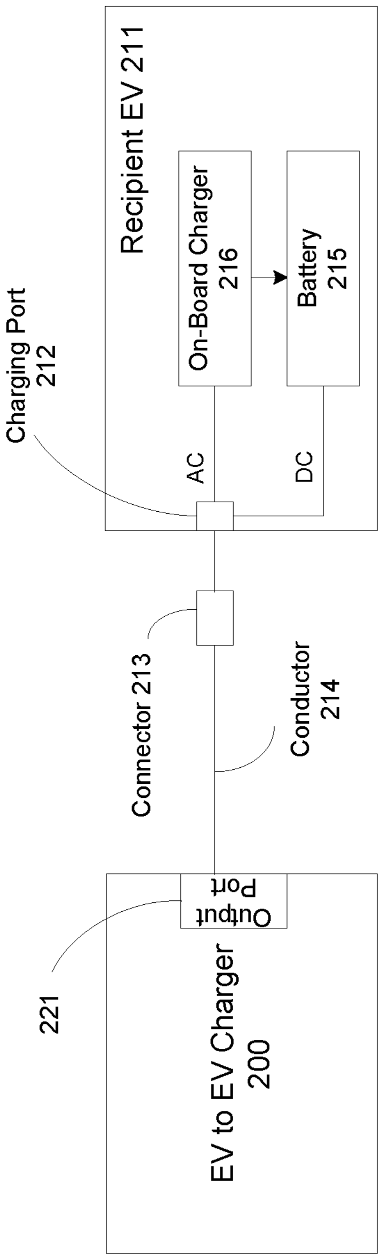
FIGS. 5A-5B illustrate the recipient EV connections to the charger.
Figure 5B:
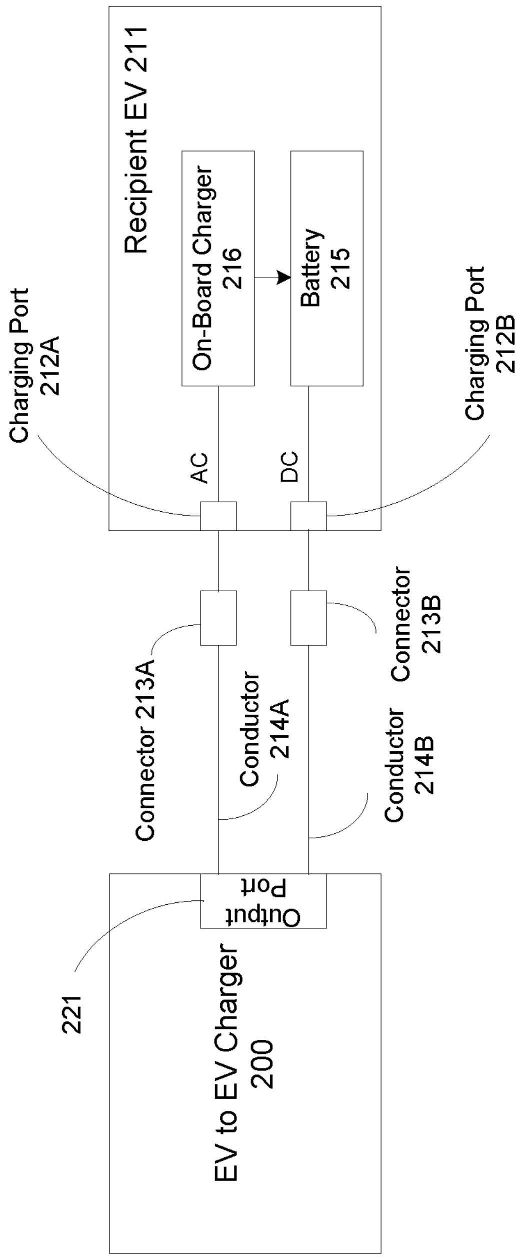

FIG. 5 illustrates the recipient EV connections to the charger 200. Referring to both FIGS. 3 and 5, the output port 221 of the charger 200 is connected to the charging port 212 of the recipient EV 211 via the connector 213 and conductor 214. The charging port 212 is connected to the recipient EV's on-board charger 216 and battery 215. Referring to FIG. 5A, some EV's are manufactured with a single charging port 212 configured to receive AC power and DC power through the same connector 213. Referring to FIG. 5B, other EV's are manufactured with an AC charging port 212A separate from a DC charging port 212B. The AC charging port 212A is configured to receive AC power through a first connector 213A and first conductor 214A. The DC charging port 212B is configured to receive DC power through a second connector 212B and a second conductor 214B. The AC charging port 212A is configured to couple to the internal on-board charger 216, and the on-board charger 216 is coupled to the battery 215. The DC charging port 212B is configured to couple to the battery 215 and bypassing the on-board charger 216 for faster charging. The power control circuit 303 of the charger 200 adjusts the power level of the signal transferred to the recipient EV 211 through the output port 221. For example, when the recipient EV 211 is configured to receive DC power, the power level of the input DC signal can be maintained or adjusted in the output DC signal to the recipient EV 211 to recharge the recipient EV's battery 215 using high power DC. For another example, when the recipient EV 211 is configured to receive AC power, the power level of the output AC signal to the recipient EV 211 can be lowered to recharge the battery 215 at a slower rate using AC power.

Figure 6:
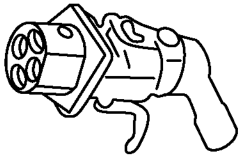
FIG. 6 illustrates a sample of existing DC charging systems and their corresponding connectors, inlets/ports, and communication protocols.
Figure 6:
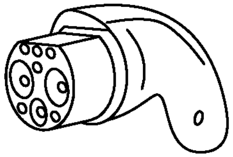
Figure 6:
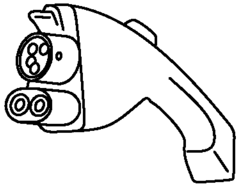
Figure 6:
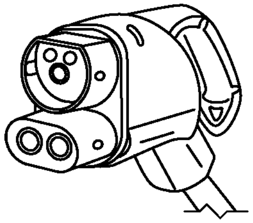
Figure 6:
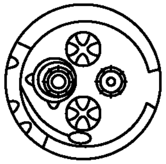
Figure 6:
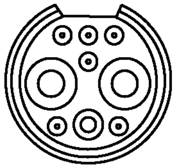
Figure 6:
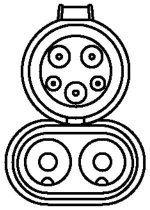
Figure 6:
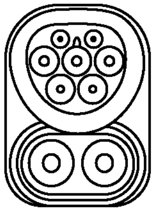

The microcontroller 301 of the charger 200 executes program code stored on a computer readable medium (see the description below with reference to FIG. 10). The microcontroller 301, in executing the program code, detects connections to and communicates with the on-board computers in the source EV 201 and the recipient EV 211, using industry standard protocols, to determine the appropriate level of DC or AC power to be transferred. The microcontroller 301 detects the connection to the source EV 201 and establishes communications with the source EV 201 using industry standard communication protocols. FIG. 6 illustrates a sample of existing DC charging systems and their corresponding connectors, inlets/ports, and communication protocols. Once the communication with the source EV 201 is established, the microcontroller 301 establishes communication with the recipient EV 211 and detects the presence of either an AC or DC signal from the charging port 212 of the recipient EV 211.

The microcontroller 301 further performs safety checks prior to beginning the charging process. Once the required safety checks are successfully completed without identifying any issues (i.e., clear), the charging process may begin. The charger 200 receives the DC signal from the source EV 201 at the input port 220. When the recipient EV 211 is configured to receive DC power, the converter circuit 304 maintains or adjusts the level of the DC signal from the input port 220 to a power level based on the power requirements of the recipient EV 211. For example, a DC power signal may be output at a level between 200V and 600V. When the recipient EV 211 is configured to receive AC power, the converter circuit 304 converts the DC signal from the input port 220 to an AC signal and adjusts the power level based on the power requirements of the recipient EV 211. For example, an AC power signal may be output at an AC Level 1 of 120V or an AC Level 2 of 208V-240V. The split circuit 302 routes the DC or AC signals to the DC connection 222 or AC connection 223, respectively, depending on whether the recipient EV 211 is configured to receive DC or AC power signals. Referring again to FIG. 3, a DC signal is received at the input port 220. The input port 220 is connected to the power control circuit 303. The power control circuit 303 regulates the voltage and current according to the design specification and requirements of the recipient EV 211. Once the energy parameters are established, the power control circuit 303 will transfer the signal to the converter circuit 304. The converter circuit 304 converts the incoming DC signal to an AC signal. The converter circuit 304 also converts and regulates the DC signals. The split circuit 302 is configured with a set of line controls (not shown), such as relays R1-R4. The appropriate relays R1-R4 are activated according to the signal required by the recipient EV 211. If the recipient EV 211 is configured to receive a DC signal, the line control relays R1 and R2, for DC positive and DC negative, are activated. If the recipient EV 211 is configured to receive an AC signal, the line control relays R3 and R4, for L1 and L2, are activated. The line control relays R1-R4 may be composed of mechanical switches or solid state switches. The activation of the line control relays R1-R4 are controlled by the microcontroller 301. Throughout the charging process, the microcontroller 301 monitors the process to ensure that safety is maintained consistent with industry standards.

Figure 7:
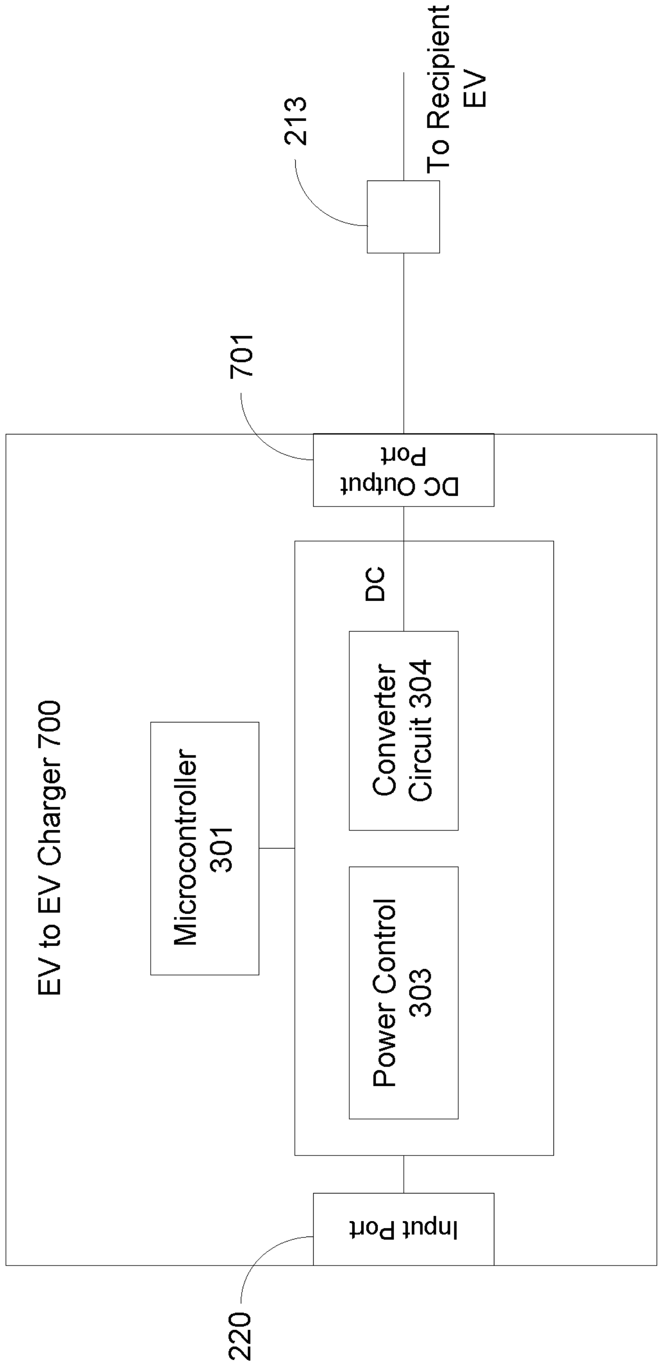
FIG. 7 illustrates a charger with a dedicated DC output port according to some embodiments.
Figure 8:
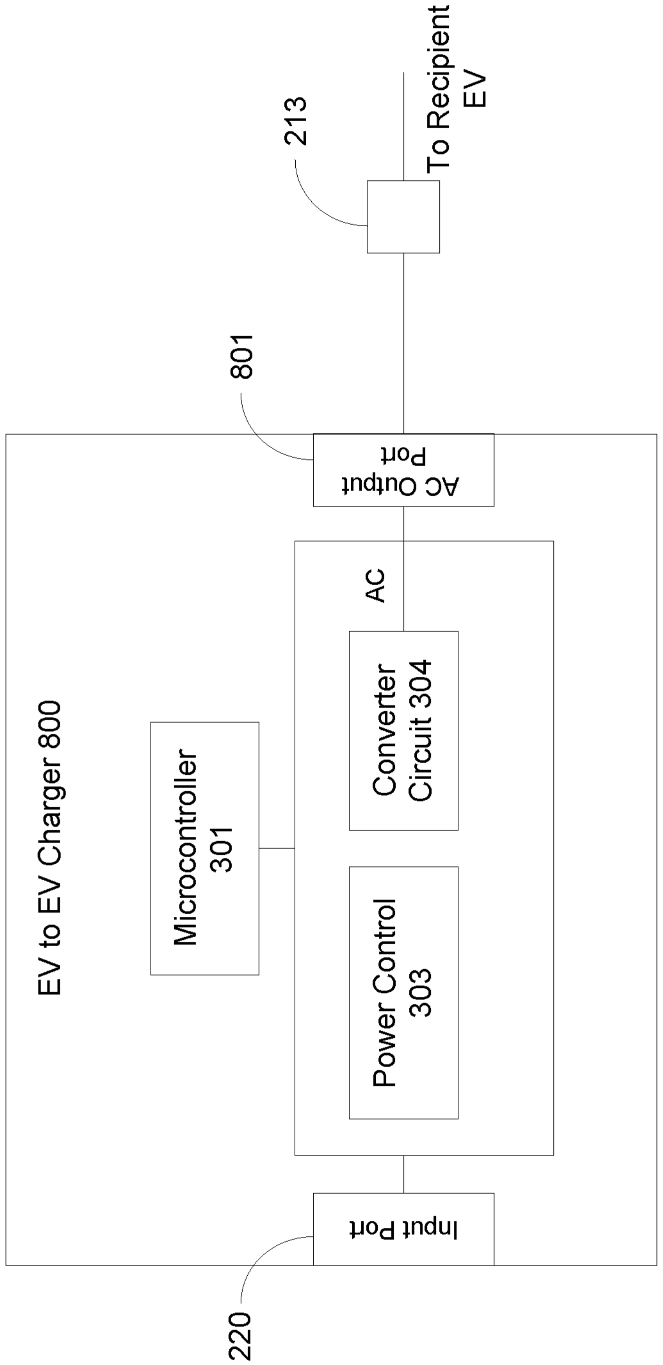
FIG. 8 illustrates a charger with a dedicated AC output port according to some embodiments.

Although FIG. 3 illustrates a charger 200 configured with the ability to output either a DC or an AC signal, a single output charger may alternatively be used. FIG. 7 illustrates a charger 700 with a dedicated DC output port 701 according to some embodiments. In this embodiment, the charger 700 is configured to receive a DC signal from the source EV 201 at its input port 220 and to output a DC signal via a dedicated DC output port 701. FIG. 8 illustrates a charger 800 with a dedicated AC output port 701 according to some embodiments. In this embodiment, the charger 800 is configured to receive a DC signal from the source EV 201 at its input port 220, convert the DC signal to an AC signal by the converter circuit 304, and output the AC signal via a dedicated AC output port 801. In the embodiments illustrated in FIGS. 7 and 8, a split circuit is not required.

Figure 9:
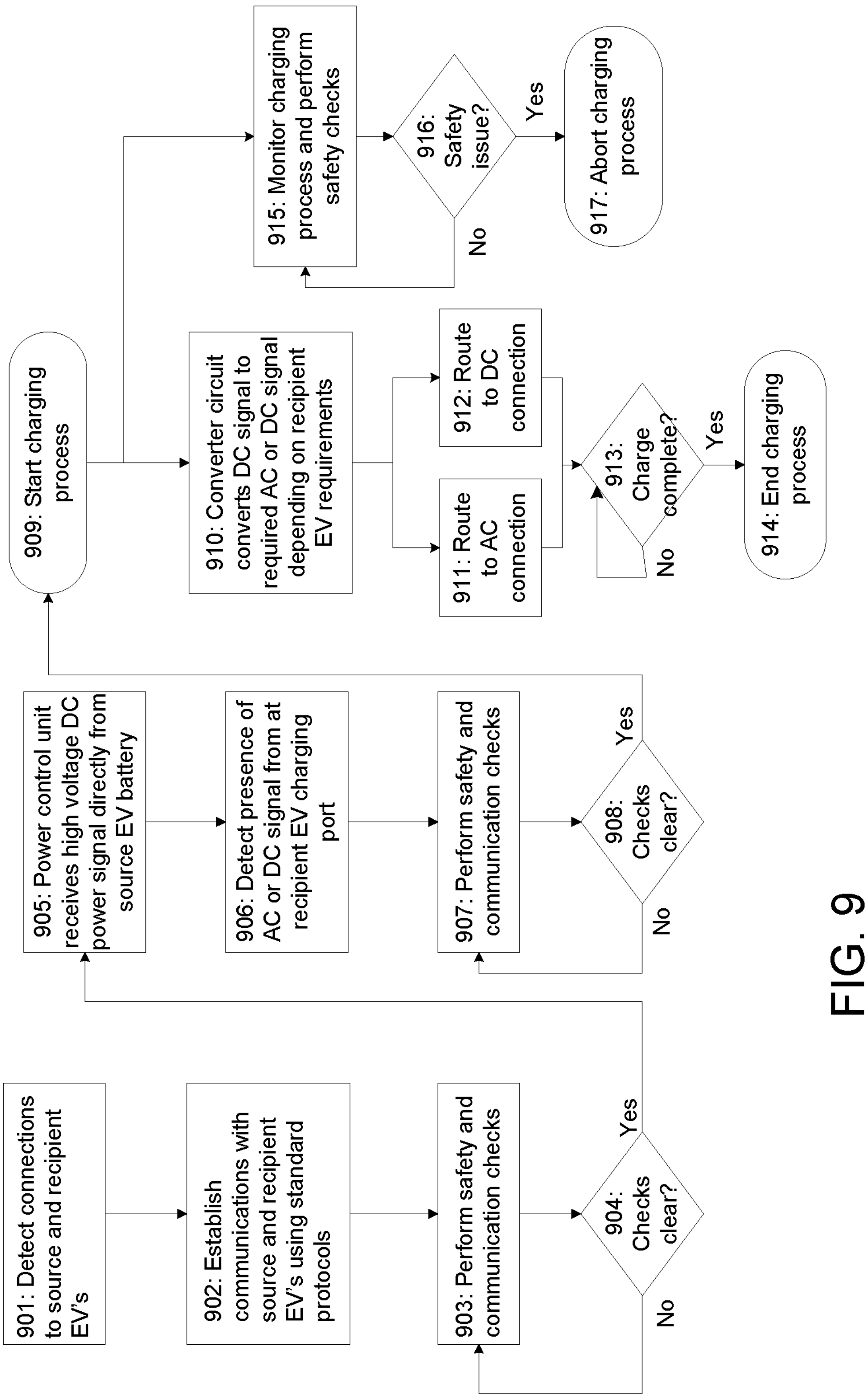
FIG. 9 is a flowchart of a charging method using the charger according to some embodiments.

FIG. 9 is a flowchart of a charging method using the charger 200 according to some embodiments. When the source EV 201 and recipient EV 211 are connected to the charger 200 as described above, the microcontroller 301 detects the connections (901). The microcontroller 301 establishes communications with the source and recipient EVs 201, 211 using standard protocols (902). The microcontroller 301 performs safety and communication checks for the source EV 201 according to industry standards (903). If the safety and communication checks are successfully completed without identifying any issues (i.e., clear) (904), the power control circuit 303 begins to receive a high voltage DC power signal directly, i.e., bypassing the source EV on-board charger 206, from the source EV battery 205 at its input port 220 (905). The microcontroller 301 also detects the presence of an AC or DC signal from the charging port 212 of the recipient EV 211 (906). The microcontroller 301 then performs safety and communication checks for the recipient EV 211 according to industry standards (907). If the safety and communication checks are clear (908), the microcontroller 301 starts the charging process (909).

In the charging process, the converter circuit 304 converts the DC signal from the source EV 201 to the required AC or DC output signal, depending on the recipient EV 211's requirements (910). If the output signal is an AC signal, the split circuit 302 routes the output signal to the AC connection 223 (911). If the output signal is a DC signal, the split circuit 302 routes the output signal to the DC connection 222 (912). Periodically throughout the charging process, the microcontroller 301 monitors the process and performs safety checks according to industry standards (915). If any safety issues are identified (916), the microcontroller 301 aborts the charging process (917). When the charge of the recipient EV 211's battery 215 is complete (913), the microprocessor 301 ends the charging process (914).

Figure 10:
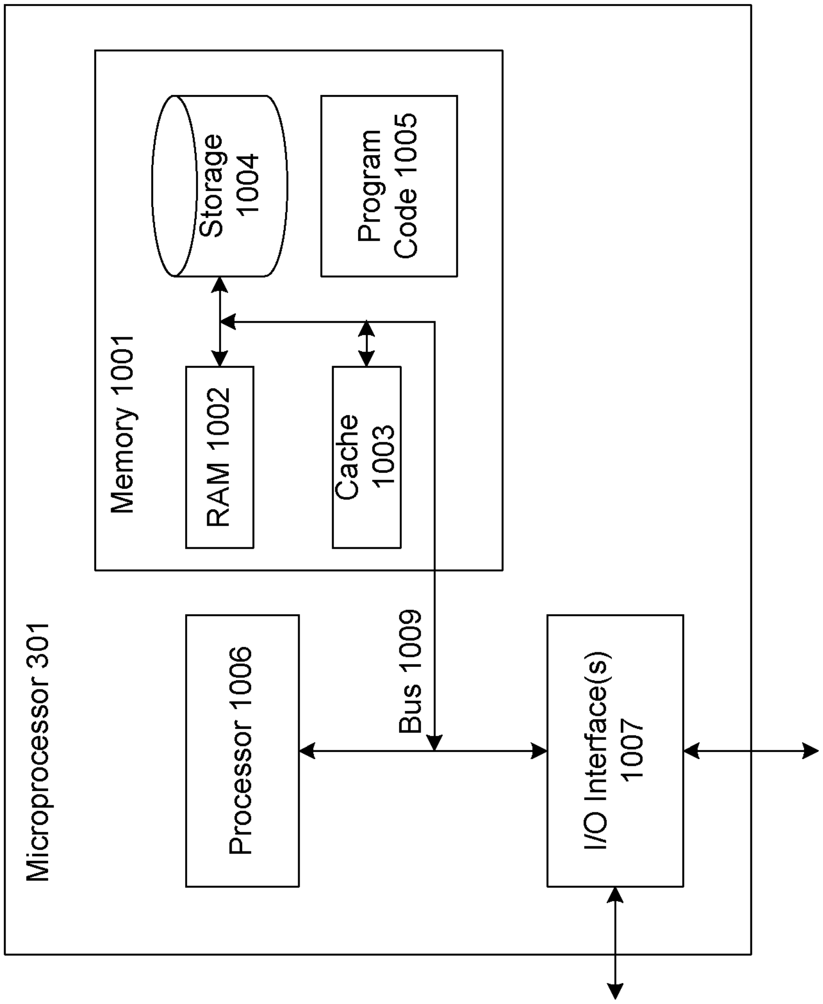
FIG. 10 illustrates a microprocessor according to embodiments of the present invention.

FIG. 10 illustrates a microprocessor according to embodiments of the present invention. The microprocessor 301 is operationally coupled to a processor or processing units 1006, a memory 1001, and a bus 1009 that couples various system components, including the memory 1001 to the processor 1006. The bus 1009 represents one or more of any of several types of bus structure, including a memory bus or memory controller, a peripheral bus, an accelerated graphics port, and a processor or local bus using any of a variety of bus architectures. The memory 1001 may include computer readable media in the form of volatile memory, such as random access memory (RAM) 1002 or cache memory 1003, or non-volatile storage media 1004. The memory 1001 may include at least one program product having a set of at least one program code module 105 that are configured to carry out the functions of embodiment of the present invention when executed by the processor 1006. The computer system 1000 may also communicate with one or more external devices 1011, such as a display 1010, via I/O interfaces 1007. The microprocessor 301 may communicate with one or more networks via network adapter 1008.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

The present invention can take the form of an embodiment containing both hardware and software elements. The present invention can include a computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A battery charger, comprising:

an input port configured to physically and electrically couple to an electrical port of a source electric vehicle;

a power control circuit for receiving a source power signal from the source electric vehicle through the input port;

a converter circuit for converting the source power signal to an alternating current (AC) output power signal or a direct current (DC) output power signal according to power requirements of a recipient electric vehicle;

an output port configured to physically and electrically couple to a charging port of the recipient electric vehicle, the output port comprising a DC connection and an AC connection; and a split circuit configured to comprise a set of line control relays for routing the AC output power signal to the AC connection or the DC output power signal to the DC connection according to the power requirements of the recipient electric vehicle; and a microcontroller configured to manage a transfer of the output power signal to the recipient electric vehicle through the output port, wherein the microcontroller detects a presence of an AC signal or a DC signal from the charging port of the recipient electric vehicle and controls activation of the set of line control relays according to the detected AC signal or the detected DC signal and according to the power requirements of the recipient electric vehicle.

2. The battery charger of claim 1, wherein the split circuit is configured to activate the line control relays R1 and R2, for DC positive and DC negative, when the recipient electric vehicle is configured to receive the DC signal wherein the split circuit is further configured to activate line control relays R3 and R4, for L1 and L2, when the recipient electric vehicle is configured to receive the AC signal.

3. The battery charger of claim 1, wherein the DC connection comprises a dedicated DC output port.

4. The battery charger of claim 1, wherein the AC connection comprises a dedicated AC output port.

5. A method for charging a battery, comprising:

(a) detecting, by a battery charger, physical and electrical connections to a source electric vehicle and a recipient electric vehicle;

(b) receiving, by the battery charger, a direct current (DC) power signal directly from a battery of the source electric vehicle;

(c) detecting, by the battery charger, an alternating current (AC) signal or a DC signal from a charging port of the recipient electric vehicle;

(d) converting, by the battery charger, the DC power signal from the battery of the source electric vehicle to an output power signal, the output power signal comprising an AC output power signal or a DC output power signal according to whether the AC signal or the DC signal is detected from the charging port of the recipient electric vehicle and according to power requirements of the recipient electric vehicle; and (e) routing, by the battery charger, the output power signal to a charging port of the recipient electric vehicle, the charging port electrically coupled to a battery of the recipient electric vehicle, comprising:

(e1) when the output power signal comprises the AC output power signal, routing the AC output power signal to an AC connection of an output port of the battery charger via a split circuit comprising a set of line control relays controlled by a microcontroller of the battery charger; and (e2) when the output power signal comprises the DC output power signal, routing the DC output power signal to a DC connection of the output port via the split circuit comprising the set of line control relays controlled by the microcontroller of the battery charger.

6. The method of claim 5, further comprising:

(f) monitoring, by the microcontroller of the battery charger, the charging of the battery of the recipient electric vehicle; and (g) aborting the charging of the battery of the recipient electric vehicle, by the microcontroller, when a safety issue is identified.

7. The method of claim 5, wherein the routing (e1) comprises activating line control relays R3 and R4 of the split circuit, for L1 and L2, when the recipient electric vehicle is configured to receive the AC output power signal, wherein the routing (e2) comprises activating line control relays R1 and R2 of the split circuit, for DC positive and DC negative, when the recipient electric vehicle is configured to receive the DC output power signal.

* * * * *